United States Patent
Abe et al.

(10) Patent No.: US 9,364,906 B2
(45) Date of Patent: Jun. 14, 2016

(54) POWER TOOL WITH HIGH-SPEED ELECTRIC MOTOR

(71) Applicant: MAKITA CORPORATION, Anjo-shi (JP)

(72) Inventors: Kenji Abe, Anjo (JP); Masayoshi Okumi, Anjo (JP); Hidenori Nagasaka, Anjo (JP); Motohiro Omura, Anjo (JP); Masaaki Fukumoto, Anjo (JP); Kenji Shibata, Anjo (JP); Nobuyasu Furui, Anjo (JP); Masanori Higashi, Anjo (JP); Kiyoshi Aoyama, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 340 days.

(21) Appl. No.: 14/155,358

(22) Filed: Jan. 15, 2014

(65) Prior Publication Data
US 2015/0020391 A1 Jan. 22, 2015

(30) Foreign Application Priority Data
Jul. 22, 2013 (JP) .................................. 2013151806

(51) Int. Cl.
*H02K 7/14* (2006.01)
*B23D 47/12* (2006.01)
*B24B 23/02* (2006.01)
(Continued)

(52) U.S. Cl.
CPC ................ *B23D 47/12* (2013.01); *B24B 23/02* (2013.01); *B24B 47/12* (2013.01); *B25F 5/02* (2013.01)

(58) Field of Classification Search
CPC ....................................................... B23D 45/16
USPC ................................................. 318/3, 34, 558
See application file for complete search history.

(56) References Cited

U.S. PATENT DOCUMENTS

| 5,238,336 A * | 8/1993 | Sanders ................ B23B 47/288 408/112 |
| 7,422,582 B2 | 9/2008 | Malackowski et al. |
| 7,768,750 B2 * | 8/2010 | Uchida ..................... B25F 5/00 320/134 |

(Continued)

FOREIGN PATENT DOCUMENTS

| JP | H0731188 A | 1/1995 |
| JP | 2003018880 A | 1/2003 |

(Continued)

OTHER PUBLICATIONS

English translation of International Search Report for counterpart PCT application No. PCT/JP2014/054683, including English translation of searched claims 1-7.

(Continued)

*Primary Examiner* — David S Luo
(74) *Attorney, Agent, or Firm* — J-TEK LAW PLLC; Jeffrey D. Tekanic; Scott T. Wakeman

(57) ABSTRACT

A hand-held power tool includes a motor having a stator and a rotor, the motor being configured to rotate the rotor at a speed of at least 40,000 rpm, an output shaft directly driven by the rotor, a tool accessory shaft configured to support a tool accessory, and a two-stage speed reducing transmission operably connecting the output shaft to the tool accessory shaft. The two-stage speed reducing transmission is configured to drive the tool accessory shaft at a rate less than the rotor speed, for example, at a rate less than or equal to 37.5% of the rotor speed.

18 Claims, 6 Drawing Sheets

(51) Int. Cl.
*B24B 47/12* (2006.01)
*B25F 5/02* (2006.01)

(56) References Cited

U.S. PATENT DOCUMENTS

| 8,928,261 B2 * | 1/2015 | Haga ................... B25B 21/002 |
| | | 318/400.01 |
| 2007/0056139 A1 * | 3/2007 | Lee ........................ A47L 5/22 |
| | | 15/412 |
| 2011/0000691 A1 | 1/2011 | Roehm |
| 2012/0160535 A1 | 6/2012 | Ikuta et al. |

FOREIGN PATENT DOCUMENTS

| JP | 2007085416 A | 4/2007 |
| JP | 2008514367 A | 5/2008 |
| JP | 2011510825 A | 4/2011 |
| JP | 2012135843 A | 7/2012 |
| JP | 2013099842 A | 5/2013 |

OTHER PUBLICATIONS

English translation of International Preliminary Report on Patentability for counterpart application No. PCT/JP2014/054683.

* cited by examiner

POWER TOOL WITH HIGH-SPEED ELECTRIC MOTOR

CROSS-REFERENCE

This application claims priority to Japanese patent application no. 2013-151806 filed on Jul. 22, 2013, the contents of which are fully incorporated herein by reference.

TECHNICAL FIELD

The present invention generally relates to power tools, such as circular saws and grinders, that are equipped with a high-speed electric motor for driving a tool accessory attached to the tool, e.g. a circular saw blade or an abrasive disk.

BACKGROUND ART

Power tools, such as circular saws, that have a high-speed brushless motor (electrically commutated motor) as the rotational drive source are currently available in the marketplace. For example, Makita Corporation, the Applicant of the present invention, currently sells a circular saw that is driven by a motor capable of rotating at approximately 25,000-30,000 revolutions per minute (rpm).

SUMMARY OF THE INVENTION

There is a long-felt need in the power tool field to reduce the weight of hand-held, portable power tools in order to make the power tools lighter and thus less burdensome to use. However, the motor constitutes a large portion of the overall weight of the power tool. In the past, only minor design changes have been attempted, e.g., to reduce the thickness or to change the shape of various power tool components. Consequently, it has not heretofore been possible to achieve significant reductions in power tool weight.

It is therefore one object of the present teachings to disclose a power tool in which a significant weight reduction can be achieved without sacrificing power tool performance, and thus to improve the ergonomics, comfort and usability of the power tool.

According to one aspect of the present teachings, the power tool, preferably a hand-held and/or portable power tool, is equipped with a motor capable of driving the motor's rotational output shaft at a rotational speed of at least 40,000 revolutions per minute (rpm).

According to another aspect of the present teachings, a speed-reducing transmission (which also may be referred to as a reduction gear unit, a gear train or a transmission) is provided to reduce the rotational speed of the motor's rotational output shaft prior to driving a tool accessory (sometimes referred to as a "tool tip") attached to the power tool. Preferably, the speed-reducing transmission comprises a first stage and a second stage, each of which reduces the rotational speed while increasing torque (mechanical advantage). The gear ratio (speed reduction) of the first stage is preferably greater than the gear ratio (speed reduction) of the second stage.

According to a third aspect of the present teachings, the tool accessory driven by the motor is preferably driven at a rotational speed of about 1,000-15,000 rpm; that is, the tool accessory is preferably driven at about 37.5% or less of the speed of the motor's rotational output shaft, more preferably between 5-15% of the speed of the motor's rotational output shaft, even more preferably 6-12%.

According to a fourth aspect of the present teachings, the first stage of the speed-reducing transmission preferably includes a first gear provided on the rotatable output shaft of the motor and a second gear that meshes or engages with the first gear. The first gear and the second gear preferably each have a module within 0.5 to 1.5. In the present specification, the term "module" means the pitch diameter (in millimeters) of a gear divided by the number of teeth on the gear.

According to a fifth aspect of the present teachings, the speed-reducing transmission may comprise a planetary gear or epicyclic gear operably disposed between (coupling) the rotatable output shaft of the motor and the tool.

According to a sixth aspect of the present teachings, the motor is preferably a brushless motor. In addition or in the alternative, the motor has a number of rotor poles that is less than or equal to six.

According to a seventh aspect of the present teachings, the electric motor is configured to be driven by a commercial AC power source, e.g., 100-240V at 50-60 Hz. A controller or regulated power supply circuit includes a rectifier circuit that does not utilize a large-capacity electrolytic capacitor. In this aspect, the overall weight of the power tool can be further reduced as compared to known power tools that utilize a large-capacity electrolytic capacitor in a rectifier circuit.

In summary, by utilizing a motor that outputs a higher rotational speed, preferably at least 40,000 rpm, the weight of motor can be reduced, and this enables the overall weight of the power tool to be reduced, preferably without sacrificing performance.

DETAILED DESCRIPTION OF THE INVENTION

Figure 1:
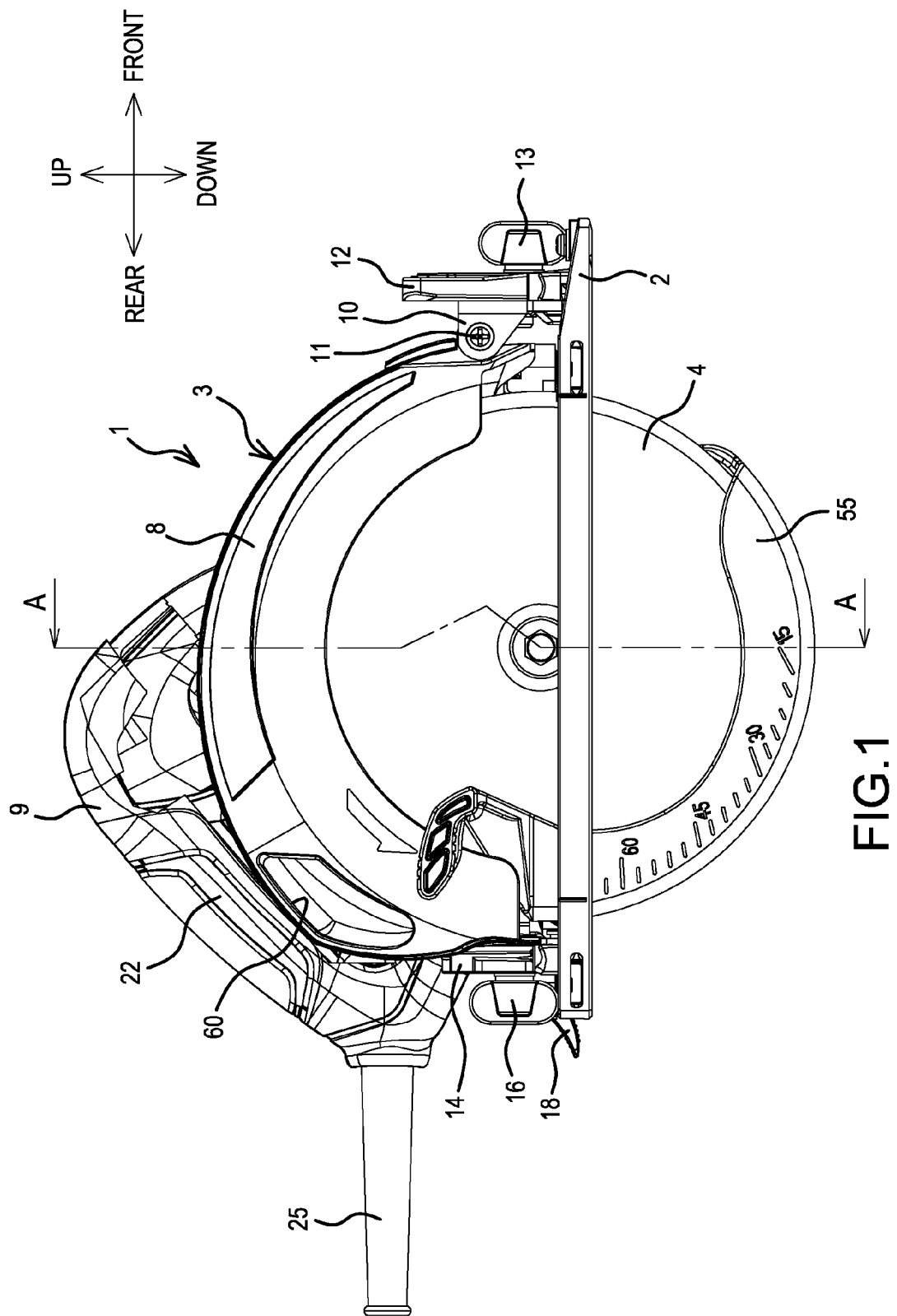
FIG. 1 is a side view of a circular saw as an example of a power tool according to the present teachings.
Figure 2:
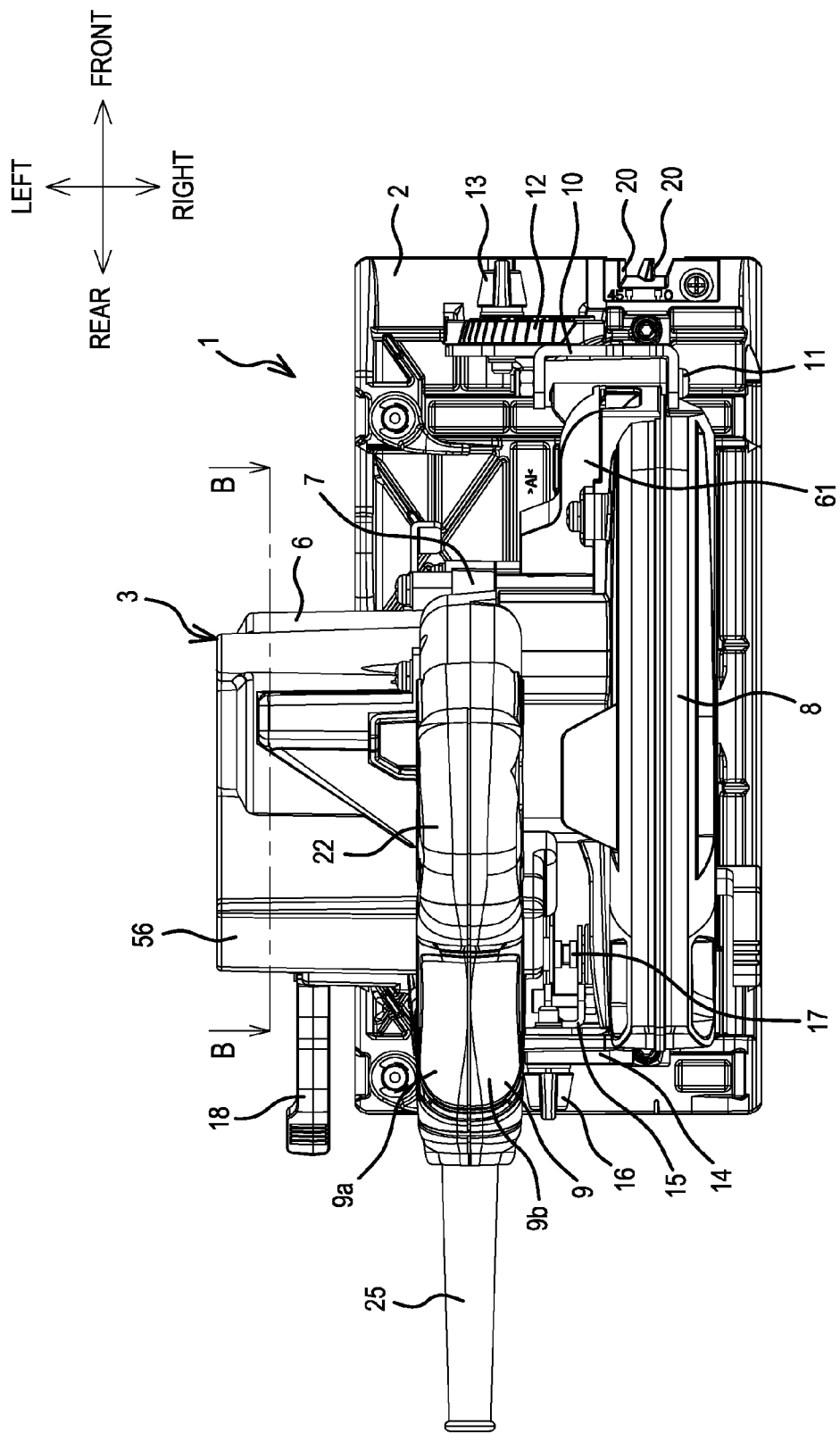
FIG. 2 is a top plan view of the circular saw of FIG. 1.

Referring to FIGS. 1 and 2, a representative example of a power tool (e.g., a circular saw) will first be described before describing representative motors and speed-reducing transmissions according to the present teachings.

The representative circular saw 1 generally includes a base 2 having a rectangular shape in plan view, a main body 3 and a circular plate-shaped saw blade 4 serving as the driven tool or tool accessory. The main body 3 includes a motor housing 6 that accommodates a brushless motor 5 for driving the blade 4, a gear housing 7 connected to the front side of the motor housing 6 (i.e. to the right of the motor housing 6 in FIG. 2), and a blade case 8 that covers an upper portion of the saw blade 4 and is connected to the front side (right side in FIG. 2) of the gear housing 7. A grip housing 9 has a loop shape and is located between the gear housing 7 and a laterally-protruding housing 56, which will be further described below.

The blade case 8 is pivotable or rotatable in the vertical direction relative to the base 2. For this purpose, the front side of the blade case 8 (as shown in FIG. 2) is pivotably attached to a connection plate 10 by a screw 11. The connection plate 10 is U-shaped in plan view and is connected to a guide plate 12 that extends perpendicular from the base 2 in the transverse direction and has an arc-shaped guide groove. The connection plate 10 is selectively and reciprocally pivotable about a pin and is fixable at any arbitrary position along the guide groove by tightening a first thumbscrew 13.

Furthermore, a guide plate 14 having an arc-shaped guide groove extends perpendicular to the base 2 in the traverse direction at the rear side of the blade case 8. A depth guide 15 curves forward in an arc-like manner at a side of the blade case 8 and is pivotably connected to the guide plate 14 via a pin so as to permit reciprocal movement. The guide plate 14 is also fixable at any arbitrary position along the guide groove by tightening a second thumbscrew 16. A roller 17 is provided on a side surface of the blade case 8 and passes through the depth guide 15. A lever 18 is attached to an extension of the rotational shaft of the roller 17 and enables a clamping of the blade case 8 at any arbitrary position.

In this manner, it is possible to adjust the cutting depth of the saw blade 4, i.e. to adjust the amount of the saw blade 4 that protrudes downward through the slot 19 in the base 2, by changing the position at which the blade case 8 is clamped along the depth guide 15 after being rotated about the screw 11.

In addition, by changing the position at which the connection plate 10 is fixed relative to the depth guide 15, the main body 3 can be pivoted and then fixed at any arbitrary tilt angle between a right angle (upright) position, where the saw blade 4 is orthogonal to the base 2, and a maximum tilted position, where the saw blade 4 is inclined towards the right side so as to be tilted at an angle of 45° relative to the base 2. Further, two notches 20 are formed in the front end of the base 2, the side edges of which are respectively positioned along the extension of the saw blade 4 at the right angle (0°) position and at the 45° position of the saw blade 4. Therefore, it is possible to easily cut along an inked line by causing the side edge of the notch 20 to coincide with (align with and move along) the inked line marked on the upper surface of a material to be cut.

The grip housing 9 is assembled by attaching a left-side housing half 9a, which is continuous with the motor housing 6, to a right-side housing half 9b using screws 21. Therefore, the rear side of the assembled grip housing 9 serves as a grip portion 22. A switch 23 (FIG. 3) is connected to a downwardly-directed trigger 24 (FIG. 4) and is accommodated in the front side of the grip portion 22. A power cord 25 is connected to the rear side of the grip portion 22.

Figure 3:
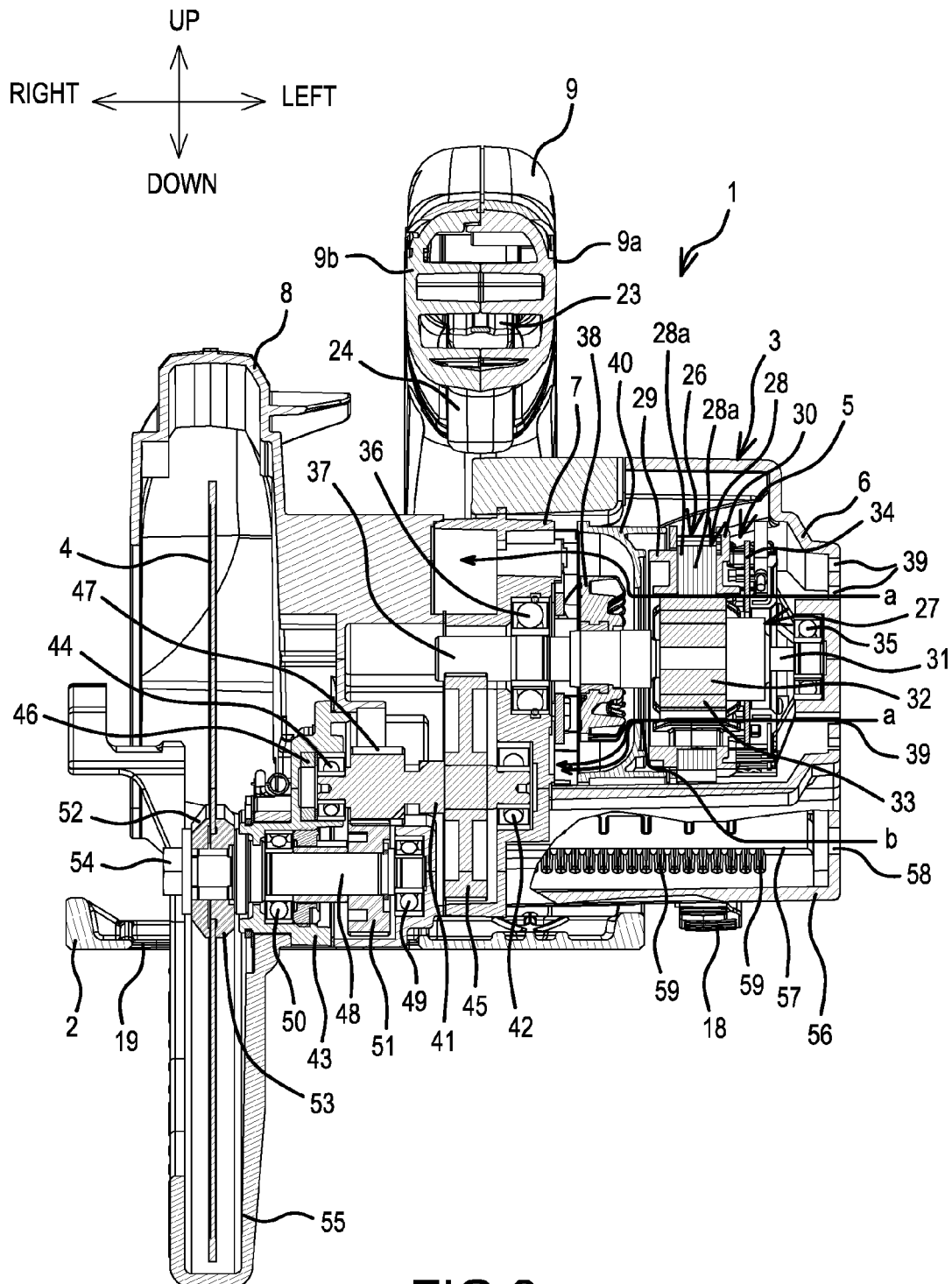
FIG. 3 is a cross-sectional view taken along line A-A in FIG. 1.

Referring now to FIG. 3, the internal components of the circular saw 1, including the brushless motor 5 and the speed-reducing transmission will be described in further detail. In the description of the interior of the main body 3 illustrated in FIG. 3, for convenience, the side at which the saw blade 4 is located will be referred to as the "right" or "front", whereas the side at which the brushless motor 5 is located will be referred to as the "left" or "rear", in view of the directional markings provided in FIG. 3, despite the fact that the "right" side of the tool 1 is on the left side of the drawing sheet.

The brushless motor 5 is preferably an internal-rotor type motor having a stator 26 that surrounds a rotor 27. The stator 26 includes a stator core 28 made of a plurality of laminated steel plates. A right (front) insulating member 29 and a left (rear) insulating member 30 are respectively provided at the front and rear of the stator core 28, i.e. the right and left sides, respectively, of the stator core 28 as shown in FIG. 3.

Figure 6:
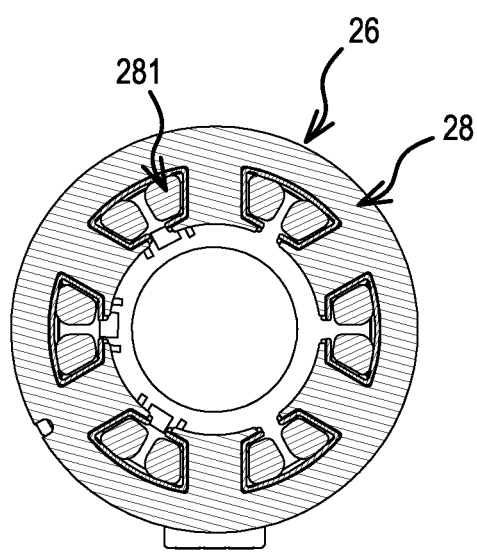
FIG. 6 is a cross-sectional view taken through a six-pole stator that may be included in the motor of the power tool of FIG. 1 or FIG. 5.

Six coils 281, illustrated in FIG. 6, are wound around the stator core 28 and over the right insulating member 29 and the left insulating member 30. However, embodiments that include fewer coils, two or four coils, for example, may also be used within the scope of certain aspects of the present teachings. Moreover, embodiments that include more coils, e.g., eight or more, are also within the scope of other aspects of the present teachings.

Furthermore, the rotor 27 includes a rotational (output) shaft 31 positioned at the motor center, a cylindrical rotor core 32 disposed around the rotational shaft 31, a cylindrical permanent magnet 33 disposed outside the rotor core 32 and having polarities that alternate in the circumferential direction, and a plurality of permanent magnets (not illustrated) for a sensor that are arranged around the left (rear) end of the core 32 in the radial direction. Three rotation detecting elements (not shown) may be configured as Hall-effect sensors in order to output rotation detecting signals by detecting the position of the permanent magnets for a sensor of the rotor 27. The rotation detection elements may be mounted on a sensor circuit substrate (board) 34 that is fixed at the left (rear) side of the rear insulating member 30 such that they can detect the signals output by the permanent magnets around the left (rear) end of the core 32.

The rotational shaft 31 is rotatably supported by a first bearing 35, which is retained within a left (rear) portion of the motor housing 6, and by a second bearing 36, which is retained in the gear housing 7. The rotational shaft 31 protrudes through the second bearing 36 towards the right (front). A first gear 37 is provided at a terminal end of the rotational shaft 31. A centrifugal fan 38 for cooling the motor is fixedly attached to the rotational shaft 31 between the second bearing 36 and the stator 26. A plurality of intake ports (holes) 39 are defined in the left (rear) surface of the motor housing 6. The rotational shaft 31 extends through a dish-shaped baffle plate 40 that surrounds the periphery of the centrifugal fan 38.

At the (right) front end of the rotational shaft 31, the first (external) gear 37 engages or meshes with a second (external) gear 45 that is connected to an intermediate shaft 41, which extends parallel to the rotational shaft 31. The front end of the intermediate shaft 41 is rotatably supported by a first bearing 44 retained within a bearing retainer 43 mounted on the blade case 8. The left (rear) end of the intermediate shaft 41 is rotatably supported by a second bearing 42 that is retained in the gear housing 7.

The diameter of the second gear 45 is larger than the diameter of the first gear 37, and thus the first and second gears 37, 45 serve as the first speed-reduction stage of the speed-reducing transmission.

A ring 46 is retained in the bearing retainer 43 forward (rightward) of the bearing 44 and bears or supports axial (thrust) loads of the bearing 44.

A third gear 47 is provided at the right (front) portion of the intermediate shaft 41 and has a smaller diameter than the diameter of the second gear 45.

A fourth gear 51 engages or meshes with the third gear 47 of the intermediate shaft 41 and is provided at a left (rear) portion of an output shaft 48, which output shaft 48 may sometimes be referred to as a "tool accessory shaft," e.g., a shaft to which a blade or other tool accessory is mounted so that it can be driven by the power tool 1. The output shaft 48 extends parallel to the intermediate shaft 41 and is rotatably supported by a first bearing 49 retained in the blade case 8 and by a second bearing 50 retained in the bearing retainer 43. The output shaft 48 extends through the bearing retainer 43 and the right (front) end thereof protrudes into the blade case 8.

The diameter of the third gear 47 is larger than the diameter of the fourth gear 51, and thus these third and fourth gears 47, 51 serve as the second speed-reduction stage of the speed-reducing transmission. The gear ratio of the first stage is preferably greater than the gear ratio of the second stage.

At the front end of the output shaft 48, the saw blade 4 is clamped to the output shaft 48 by an outer flange 52 and an inner flange 53, and is fixed by a bolt 54 screwed into the center of the output shaft 48 from the right (front). A safety cover 55 is pivotably mounted on the bearing retainer 43 inside the blade case 8. The safety cover 55 is rotationally biased or urged towards a normal or original position that covers the lower side of the saw blade 4, as illustrated in FIG. 1, when the circular saw 1 is not in use.

Figure 4:
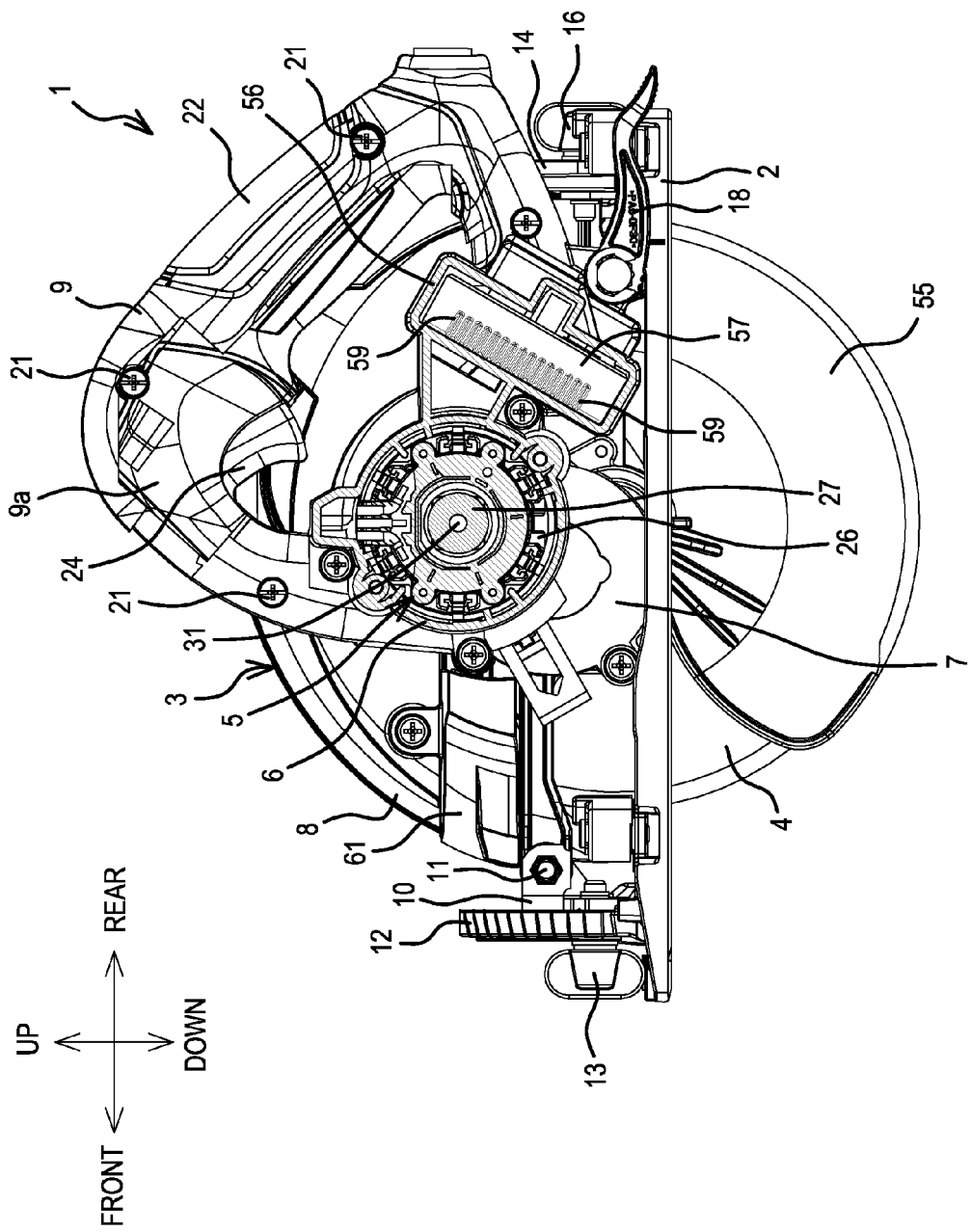
FIG. 4 is a cross-sectional view taken along line B-B in FIG. 2.

Referring now to FIG. 4, the laterally-protruding housing 56 is continuous with (consecutively connected to) the rear of the motor housing 6, and a controller 57 is accommodated inside the laterally-protruding housing 56. The controller 57 accommodates a control circuit substrate or circuit board (not illustrated), on which a microcomputer (e.g., at least one microprocessor and memory) and other components, such as one or more diodes or a smoothing capacitor, a switching element, etc. are mounted so as to form a rectifier circuit or an inverter circuit.

In this exemplary embodiment, a smoothing or reservoir capacitor having a small capacitance (e.g., approximately several hundred μF, e.g., 200-700 μF) is preferably provided at the output side of the rectifier circuit, instead of a smoothing (reservoir) capacitor (electrolytic capacitor) having a relatively large capacitance as is known in the related art. That is, the controller itself does not contain an electrolytic capacitor; instead thereof, a separate capacitor, smaller than a conventional electrolytic capacitor used in conventional controllers, is provided at the output of the rectifier circuit.

In addition, the inside of the laterally-protruding housing 56 communicates with the motor housing 6, and an intake port 58 (see FIG. 3) is defined in the left (rear) end surface of the laterally-protruding housing 56. Heat-radiating fins 59 protrude from a surface of the controller 57.

It is possible to reduce the weight of the brushless motor 5, as compared to brushless motors of the conventional art, by reducing the number of laminated layers of steel plates 28*a* of the stator core 28 of the stator 26. For example, conventional brushless motors often have 40 layers, whereas preferred brushless motors 5 according to the present teachings preferably have 2 to 20 layers, more preferably 6 to 14 layers and yet more preferably 8.4 layers. Furthermore, by reducing the number of lamination layers, the size of the brushless motor 5 in the axial direction can also be reduced.

The number of laminations used will depend in part upon the size of the motor and the amount of torque that must be produced by the motor, but in any case, as discussed below, the number of lamination layers can be less than the number of lamination layers that would be required by a conventional power tool having similar performance characteristics.

Due in part to these design changes, the rotational shaft 31 of the brushless motor 5 is capable of rotating at a high speed, e.g., at a rotational speed of 40,000 rpm to 80,000 rpm or even 120,000 rpm or more. These speeds are significantly higher than the speeds at which certain tools, such as the saw blade of a circular saw, are desirably driven. However, a high-speed brushless motor combined with speed reduction gears, in particular, a two-stage reduction gear arrangement, provides operational performance comparable to the performance of conventional power tools, circular saws, for example, while noticeably reducing the weight of the power tool.

Surprisingly, it has been found that the weight increase produced by the addition of a two-stage reduction gear is more than offset by the weight reduction made possible by using a high-speed motor that produces less torque than was conventionally required to operate a similar power tool.

As used herein, the phrase "two-stage reduction gear arrangement" is intended to include reduction gear arrangements having two, or more than two, reduction stages.

By using a smaller (lesser) number of laminations than are used in comparable conventional power tool motors, it is possible to drive the rotor 27 at high (er) speeds. This is because the amount of interlinked magnetic flux in the stator is reduced by this small (er) number of laminations, and this in turn reduces the counter-electromagnetic force produced in the motor 5. Consequently, the rotor 27 is capable of rotating at a greater or higher speed than a motor having a larger, conventional, number of laminations.

It is preferable that the first gear 37 and the second gear 45 have modules that are set within the range of 0.5 to 1.5 such that the rotational speed of the output shaft 48 can be maintained within a range of 4,000 to 6,000 rpm (similar to the related art), even though the rotational speed of the rotational shaft 31 in this case is at least six times faster than the desired speed of the output shaft 48.

In addition, the gear (reduction) ratio of the first gear 37 and the second gear 45, which serve as the first stage of the speed-reducing transmission, is set to be greater than the gear (reduction) ratio of the third gear 47 and the fourth gear 51, which serve as the second stage of the speed-reducing transmission.

In the circular saw 1 having the above-described configuration, once the trigger 24 has been pulled upward, the switch 23 is actuated and supplied with current from a commercial power source, and the brushless motor 5 is driven using a direct current (DC) rectified by the controller 57. More specifically, rotation detecting signals output from the rotation detecting elements of the sensor circuit substrate 34 (which indicates the positions of the permanent magnets for a sensor of the rotor 27) are supplied to the microcomputer of the controller 57, which then determines the rotational state (position) of the rotor 27. Then, the microcomputer controls the ON and OFF state of the respective switching elements in accordance with the determined rotation state. Thereafter, the microcomputer causes current to sequentially flow to the respective coils of the stator 26 which causes the rotor 27 to rotate. As a result, the rotational shaft 31 will rotate, and its rotational energy is transmitted to the intermediate shaft 41 via the first gear 37 and the second gear 45. Further, the rotational energy of the intermediate shaft 41 is transferred to the output shaft 48 via the third gear 47 and the fourth gear 51, and causes the saw blade 4 to rotate so that it can cut a wooden board or other material.

When the centrifugal fan 38 rotates together with the rotational shaft 31, cooling air flows in the direction of arrow "a" through the intake port 39 towards the inside of the motor housing 6, passes through and cools the brushless motor 5 and is then re-directed by the baffle plate 40 towards the gear housing 7. In addition, cooling air flows in the direction of arrow b through the intake port 58 towards the interior of the motor housing 6, passes through and cools the controller 57 and then is also re-directed by the baffle plate 40 towards the gear housing 7. A large portion of the cooling air that flows into the gear housing 7 is exhausted into the blade case 8 so that it converges with an air-flow generated by the rotation of the saw blade 4, and is ultimately discharged through an exhaust port 60 defined on the right side surface of the blade case 8. The remaining portion of the cooling air flows towards the front end of the blade case 8, passes through a duct 61 provided on the left side surface of the blade case 8 and is forced out towards the front end of the base 2. Accordingly, this airflow prevents the inked line from being covered with cutting chips during a cutting operation.

As was discussed above, the circular saw 1 of the present embodiment utilizes the brushless motor 5, which is capable of rotating at 40,000 rpm or more, and this enables the weight of both the brushless motor 5 and the power tool as a whole to be reduced. It is understood that this value is a rated or nominal value of the motor 5 and thus, the motor can be safely and reliably operated at 40,000 rpm or more without permanently damaging the motor 5.

The present teachings may be modified in various ways without departing from the scope or spirit of the claimed subject matter.

For example, the brushless motor may be embodied as a switched reluctance motor, a high-frequency motor, or another type of suitable brushless motor.

In addition, the number of rotor poles can be appropriately changed to six or less. By utilizing six poles or less, the number of coils that are required to be driven using the controller can be reduced. As a result, it becomes less complex to control the brushless motor. This may be particularly important as the speed of the motor increases because the number of signals that must be processed by a controller in order to drive an electric motor is related to the product of the number of poles and the rotation rate of the motor. Controlling a six-pole (six coil) motor operating at 40,000 rpm (6×40,000=240,000) is thus computationally similar to controlling a two-pole motor at 120,000 rpm (2×120,000=240,000). In other words, for two motors operating at the same speed, it is easier to control the motor that has a smaller number of poles or coils.

In the exemplary embodiment, the number of laminated layers of the steel plates of the stator core is reduced to achieve a reduction in weight. However, in addition or in the alternative, it is also possible to achieve a reduction in weight by reducing the number of turns of the coils. Either or both of these changes may reduce the torque produced by the motor. However, the torque is amplified by the reduction gear train described above, and the weight reduction provided by the lower-torque motor is greater than the weight increase produced by the presence of the reduction gear train.

In addition, although the exemplary embodiment was described in the context of a circular saw, power tools of the present teachings are not limited to such saws. For example, the present teachings can also be applied to other power tools such as screwdrivers and grinders, as well as gardening tools such as clippers, trimmers, etc.

Moreover, the speed-reducing transmission is not limited to a structure that reduces the rotational speed of the brushless motor by disposing an intermediate shaft and an output shaft at respective eccentric (offset) positions with respect to the rotational shaft of the brushless motor. Instead, in certain embodiments of the present teachings, a planetary gear may be disposed between the rotational shaft of the motor and the tool to perform the speed-reduction function, as will be further described below.

Furthermore, the rotational speed of the tool is not limited to the preferred range of 4,000 to 6,000 revolutions per minute, but may generally fall within the broader range of about 1,000-15,000 revolutions per minute. Thus, the speed reducing gears used with a motor operating at about 40,000 rpm must reduce the speed of a motor output shaft by a factor of at least about 2.5 to 40 or, in other words, to less than about 37.5% of the speed of the motor output shaft or to less than about 15% of the speed of the motor shaft, for example.

Figure 5:
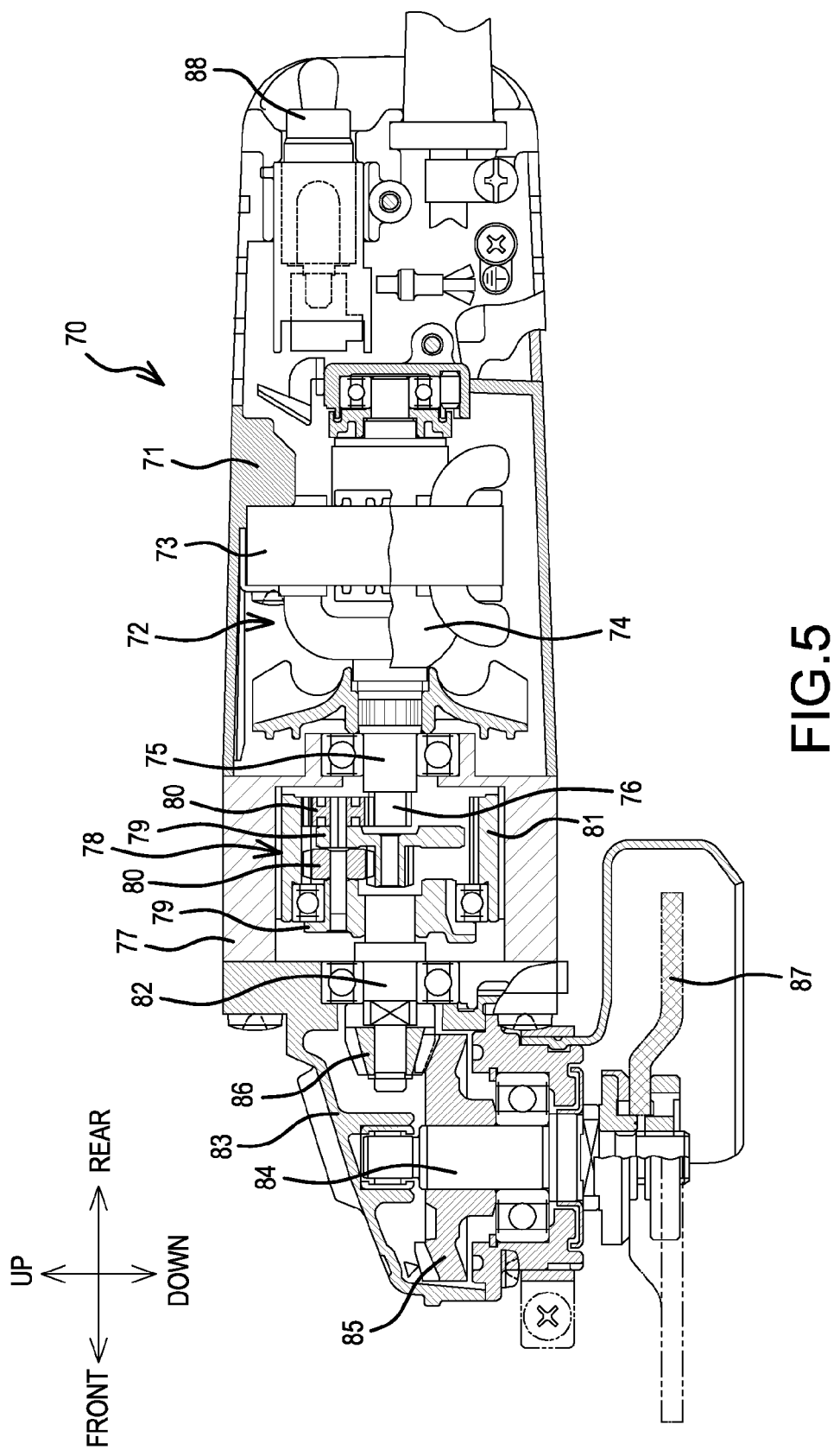
FIG. 5 is a longitudinal sectional view of a grinder as another example of a power tool according to the present teachings.

FIG. 5 illustrates an example of a grinder that utilizes a representative planetary gear transmission according to the present teachings. In the grinder 70, a motor 72 that includes a stator 73 and a rotor 74 is accommodated inside a motor housing 71 which is located at the rear of the motor housing. (The left side in FIG. 5 will be referred to as the front, and the right side as the rear, in the following description).

The planetary gear transmission 78 is provided inside a gear housing 77 that is connected to the front of the motor housing 71. Carriers 79 support a plurality of planetary gears 80 which orbit inside an internal gear 81 and are disposed in two stages in the axial direction. In addition, a pinion 76 is provided at the tip of a rotational shaft 75 of the rotor 74 and is engaged or meshed with the planetary gear 80 of the first stage. An output shaft 82 is provided in the carrier 79 of the second stage and protrudes into a front housing 83 which is connected to the front of the gear housing 77.

A spindle 84 is pivotally supported inside the front housing 83 in an orthogonal manner relative to the output shaft 82 so as to cause a bevel gear 85 provided in an intermediate portion to engage or mesh with a bevel gear 86 provided on the output shaft 82. A disk-shaped grindstone (abrasive disk) 87 serves as the tool accessory or tool tip and is mounted on the lower end of the spindle 84 that protrudes from the front housing 83. A switch 88 is accommodated in the rear portion of the motor housing 71.

Similar to the above-described circular saw embodiment, the number of laminated layers of the stator 73 of the grinder 70 is preferably reduced to cause or allow the rotational speed of the rotational shaft 75 of the motor 72 to increase to 40,000 rpm or more, and the rotational speed of the spindle 84 is set within the range of 6,000 to 15,000 revolutions per minute by a suitable selection of the gear ratio of the planetary gear transmission 78.

Consequently, the grinder 70 of the present embodiment also utilizes a reduced-weight motor 72 that rotates at rotational speed of at least 40,000 rpm such that the overall weight of the power tool can be reduced while providing an operational performance that is comparable to that provided by heavier, conventional, grinders.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved hand-held power tools, as well as methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional representative, non-limiting embodiments of the present teachings include:

1. A hand-held power tool (1; 70) comprising:
a motor (5) having a stator (26) and a rotor (27), the motor being adapted to rotate the rotor at a rotational speed of at least 40,000 rpm.

2. The hand-held power tool (1; 70) according to embodiment 1, wherein the motor (5) is a brushless motor having a number of rotor poles (281) that is less than or equal to six.

3. The hand-held power tool (1; 70) according to any preceding embodiment, wherein the stator (26) is comprised of 2-20 laminated steel plates.

4. The hand-held power tool (1; 70) according to embodiment 3, wherein the stator (26) is comprised of 6-14 laminated steel plates.

5. The hand-held power tool (1; 70) according to any preceding embodiment, further comprising:
a speed-reducing transmission operably coupled to the rotor (27) and adapted to drive a tool accessory shaft (48) at a rotational speed within the range of 1,000-15,000 revolutions per minute, more preferably 4,000-6,000 revolutions per minute.

6. The hand-held power tool (1; 70) according to embodiment 5, wherein the two-stage speed reducing transmission is adapted to drive the tool accessory shaft (48) at a rate of less than or equal to 37.5% of the rotor speed, more preferably at a rate of less than or equal to 15% of the rotor speed.

7. The hand-held power tool (1; 70) according to embodiment 6, wherein the two-stage speed reducing transmission is adapted to drive the tool accessory shaft (48) at a rate of 6-12% of the rotor speed.

8. The hand-held power tool (1; 70) according to any one of embodiments 5-7, wherein the speed-reducing transmission comprises a first stage (37, 45; 79, 80) and a second stage (47, 51; 79, 80), wherein the gear ratio of the first stage is greater than the gear ratio of the second stage.

9. The hand-held power tool (1) according to embodiment 8, wherein the first stage (37, 45) includes a first gear (37) provided on an output rotational shaft (31) of the motor (5) and a second gear (45) meshing with the first gear, and wherein the first gear and the second gear each have a module in the range of 0.5 to 1.5.

10. The hand-held power tool (1) according to embodiment 9, wherein the second stage (47, 51) includes a third gear (47) provided on an intermediate shaft (41) connected to the second gear (45), and a fourth gear (51) meshing with the third gear.

11. The hand-held power tool (70) according to embodiment 8, wherein the speed-reducing transmission comprises a planetary gear transmission (78).

12. The hand-held power tool (1; 70) according to any preceding embodiment,
wherein the power tool is adapted to utilize a commercial AC power source as its power source,
the motor (5) is a DC motor and
wherein the power tool further comprises:
a controller (57) having a rectifier circuit that does not include an electrolytic capacitor.

13. The hand-held power tool (1; 70) according to embodiment 12, wherein the rectifier circuit comprises a smoothing or reservoir capacitor having a capacitance of 200-700 μF.

14. The hand-held power tool (1; 70) according to any preceding embodiment, including a circular saw blade (4) or an abrasive disc (87) rotatably driven by the motor (5).

15. A method of operating the hand-held power tool (1; 70) according to any preceding embodiment, comprising:
rotating the motor (5) at a rotational speed of at least 40,000 revolutions per minute, the rotational output of the motor being coupled to a (the) speed-reducing transmission which is coupled to a (the) tool accessory shaft (48), and rotatably driving a tool (4; 87) attached to the tool accessory shaft (48) at a rotational speed of 4,000-6,000 revolutions per minute.

We claim:

1. A hand-held power tool comprising:
a motor having a stator and a rotor, the motor being configured to rotate the rotor at a rotational speed of at least 40,000 rpm, and
a speed-reducing transmission operably coupled to the rotor, the speed-reducing transmission comprising a first stage and a second stage, wherein the first stage has a gear ratio that is greater than a gear ratio of the second stage,
wherein the speed-reducing transmission is configured to drive a tool accessory at a rotational speed within the range of 1,000-15,000 revolutions per minute.

2. The hand-held power tool according to claim 1,
wherein the first stage includes a first gear provided on an output rotational shaft of the motor and a second gear meshing with the first gear, and wherein the first gear and the second gear each have a module in the range of 0.5 to 1.5.

3. The hand-held power tool according to claim 1,
wherein the speed-reducing transmission comprises a planetary gear transmission.

4. The hand-held power tool according to claim 1,
wherein the motor is a brushless motor having a number of rotor poles that is less than or equal to six.

5. The hand-held power tool according to claim 1,
wherein the power tool is configured to utilize a commercial AC power source as its power source,
the motor is a DC motor and
wherein the power tool further comprises:
a controller having a rectifier circuit that does not include an electrolytic capacitor.

6. The hand-held power tool according to claim 5, wherein the rectifier circuit comprises a smoothing or reservoir capacitor having a capacitance of 200-700 μF.

7. The hand-held power tool according to claim 1, including a circular saw blade operably connected to the rotor by a speed-reducing transmission.

8. The hand-held power tool according to claim 1, wherein the motor is a brushless motor and the stator is comprised of 6-14 laminated steel plates.

9. The hand-held power tool according to claim 1, wherein:
the first stage includes a first gear provided on an output rotational shaft of the motor and a second gear meshing with the first gear, the first gear and the second gear each having a module in the range of 0.5 to 1.5,
the motor is a brushless motor having a number of rotor poles that is less than or equal to six, the stator being comprised of 6-14 laminated steel plates.

10. The hand-held power tool according to claim 9,
wherein the power tool is configured to utilize a commercial AC power source as its power source,
the motor is a DC motor and
wherein the power tool further comprises:
a controller having a rectifier circuit that does not include an electrolytic capacitor.

11. The hand-held power tool according to claim 10, wherein the rectifier circuit comprises a smoothing or reservoir capacitor having a capacitance of 200-700 μF.

12. A hand-held power tool comprising:
a motor having a stator and a rotor and configured to rotate the rotor at a speed of at least 40,000 rpm;
an output shaft directly driven by the rotor;
a tool accessory shaft configured to support a tool accessory; and
a two-stage speed reducing transmission operably connecting the output shaft to the tool accessory shaft,
wherein the two-stage speed reducing transmission is configured to drive the tool accessory shaft at a rate less than or equal to 37.5% of the rotor speed.

13. The hand-held power tool according to claim 12, wherein the two-stage speed reducing transmission is configured to drive the tool accessory shaft at a rate less than or equal to 15% of the rotor speed.

14. The hand-held power tool according to claim 13, wherein the two-stage speed reducing transmission includes a first stage and a second stage and wherein the first stage has a gear ratio that is greater than a gear ratio of the second stage.

15. A hand-held circular saw comprising:
a base;
a motor housing connected to the base;
a gear housing connected to the motor housing;
a blade case connected to the gear housing;
a safety cover mounted for pivotable movement into the blade case;
a tool accessory shaft configured to support a circular saw blade in the blade case;
a motor in the motor housing having a stator and a rotor, the motor being configured to rotate the rotor at a speed of at least 40,000 rpm;
an output shaft directly driven by the rotor; and
a two-stage speed reducing transmission operably connecting the output shaft to the tool accessory shaft,
wherein the two-stage speed reducing transmission is configured to drive the tool accessory shaft at a rate less than or equal to 15% of the rotor speed.

16. The hand-held circular saw according to claim 15, wherein the two-stage speed reducing transmission includes a first stage and a second stage and wherein the first stage has a gear ratio that is greater than a gear ratio of the second stage.

17. The hand-held circular saw according to claim 16, wherein:
the first stage includes a first gear provided on an output rotational shaft of the motor and a second gear meshing with the first gear, the first gear and the second gear each having a module in the range of 0.5 to 1.5, and
the motor is a brushless motor having a number of rotor poles that is less than or equal to six, the stator being comprised of 6-14 laminated steel plates.

18. The hand-held circular saw according to claim 17,
wherein the circular saw is configured to utilize a commercial AC power source as its power source,
the motor is a DC motor and
wherein the circular saw further comprises:
a controller having a rectifier circuit that comprises a smoothing or reservoir capacitor having a capacitance of 200-700 µF, but which rectifier circuit does not include an electrolytic capacitor.

* * * * *